G. CHRISTIAN.
CARBURETER.
APPLICATION FILED NOV. 24, 1913.
1,110,041.
Patented Sept. 8, 1914.
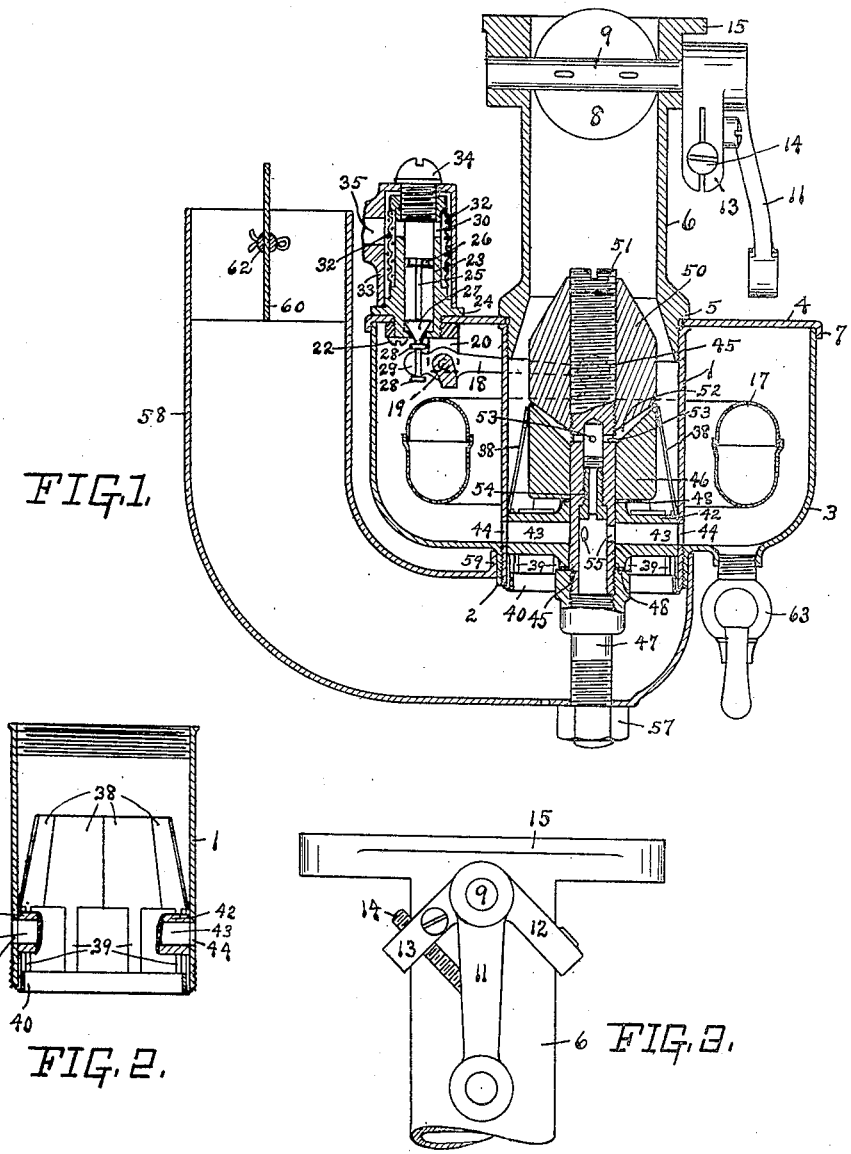
WITNESSES:
L. S. Woodhull.
Hugo W. Kreinbring
INVENTOR
Gilbert Christian.
BY
Edward N. Pagelsen
ATTORNEY

UNITED STATES PATENT OFFICE.

GILBERT CHRISTIAN, OF DETROIT, MICHIGAN.

CARBURETER.

1,110,041.
Specification of Letters Patent.
Patented Sept. 8, 1914.

Application filed November 24, 1913. Serial No. 802,592.

*To all whom it may concern:*

Be it known that I, GILBERT CHRISTIAN, a citizen of the United States, and a resident of Detroit, in the county of Wayne and State of Michigan, have invented a new and Improved Carbureter, of which the following is a specification.

This invention relates to means for combining air and hydrocarbon vapor to constitute an explosive mixture, suitable for use in internal-combustion engines; and its object is to provide means for insuring an intimate mixture of this character under all the different conditions resulting from the various positions of the throttle valve.

This invention consists, in combination with an outer shell of the mixing or carbureting chamber, and a fuel-discharge nozzle consisting of a cylindrical body having a circumferential discharge opening, of a movable deflector for directing the current of air passing through the mixing chamber against the nozzle at the line of said opening.

In the accompanying drawing, Figure 1 is a central vertical section of the improved carbureter. Fig. 2 is a similar section of the shell of the mixing chamber and of the deflector. Fig. 3 is an elevation of the throttle valve lever.

Similar reference characters refer to like parts throughout the several views.

In the present device, the shell 1 of the mixing chamber has its lower end threaded to screw into the flange 2 of the float chamber 3. A cover 4 of the float chamber may be held in position by the shoulder 5 of the discharge connection 6 and by its own flange 7. This tubular discharge connection 6 is provided with a throttle valve 8 mounted on the shaft 9, to which are connected the arms 11, 12 and 13, preferably integral with each other, the last having an adjustable screw 14, which, together with the arm 12, are adapted to engage the flange 15 at the upper end of the connection 6. This screw controls the opening around the throttle valve when in its "closed" position. Any desired operating device may be connected to the arm 11.

In the float chamber may be mounted the float 17 on the lever 18, pivoted at 19 in the bracket 20. This bracket may be secured to the cover 4 in any desired manner, preferably by the screws 22. The valve chamber 23 may be screwed into the bracket in such a manner that its flange 24 rests on the cover 4. The valve stem 25 may have a fluted head 26 at its upper end, the valve 27 intermediate its ends and the flanges 28 below the valve between which flanges the projections 29 on the lever 18 may extend. The valve chamber has openings 30 which connect its interior with the space within the screen 32. A shell 33 is shown secured in position around the valve chamber by means of a screw 34 and has an inlet opening 35 for the fuel. This opening may extend in any desired direction and the shell 33 may be positioned when the screw 34 is slacked up. The liquid fuel enters through the opening 35 and flows through the screen 32 and openings 30 to the interior of the valve chamber.

Mounted within the shell 1, are a series of vanes 38, preferably tapering and inclined toward each other, as shown in Fig. 2, and each is supported by a narrow stem 39 whose lower end is seated between the ring 40 and the lower end of the shell 1, within which the stems and ring 40 are secured. Extending across the lower end of the shell 1 is a tubular support 42, having a passage 43 communicating, through the holes 44 in the shell, with the float chamber.

A vertical tube 45 has a collar 46 secured to it and extends through the support 42. An extension 47 has an internal thread to engage the threaded lower end of the tube 45 and hold it and the collar in position, washers 48 preventing leakage around the tube. A second collar 50 is adjustably mounted on the screw threaded upper end of the tube 45, being locked in any desired position by the screw 51. The adjacent ends of the two collars are so formed that an upwardly inclined circumferential upwardly tapering passage 52 for the liquid fuel is formed, whose discharge orifice is circumferential. This passage 52 connects through the small holes 53 to the bore of the tube, and a bushing 54 having a calibrated bore controls the maximum flow of the fuel. Holes 55 connect the bore of this tube 45 with the passages 43. The tube 45 and collars 46 and 50 constitute the fuel nozzle.

A nut 57 may be used to secure the pipe 58 of any desired form to the carbureter, which pipe is adapted to convey hot air from any convenient source to the bottom of the carbureter, the flange 59 preferably fitting around the flange 2 of the float chamber. A choke valve 60 may be mounted on the shaft 62 in any portion of the pipe 58 if desired. The float chamber may be drained by the cock 63.

The operation of this carbureter is as follows. Fuel will flow through the passage 35 and around the valve 27 into the float chamber and be at a constant predetermined height in the float chamber in the usual manner, and therefore also stand in the tube 45 just below the circumferential discharge opening of the fuel nozzle. When the engine, to which the carbureter is attached, begins to run, the pressure of air within the shell 1 is reduced below atmospheric, and the liquid fuel will flow out through the circumferential discharge orifice. At the same time, air will flow down the pipe 58 and up through the shell 1 around the arms of the support 42 and between the collar 46 and the vanes 38, whose upper ends rest against this collar. As a result, the air will press out these upper ends but will be directed by these vanes against the liquid fuel which is escaping from the circumferential opening of the nozzle, thus causing an immediate and intimate mixture. No matter how great may be this flow of air, or how far the vanes 38 may be swung out thereby, a sufficient portion of the air will always be directly against the fuel. When the flow of air is small, this contact of the current of air and the fuel is of prime importance and is always effected by means of the vanes 38.

The details and proportions of this device may all be changed to conform to the demands of various engines without departing from the spirit of my invention.

I claim:

1. In a carbureter, the combination of a cylindrical mixing chamber, a cylindrical fuel nozzle therein having a circumferential discharge opening, means for supplying liquid fuel thereto, and a series of yieldable vanes mounted in the mixing chamber below the fuel discharge opening with their lower ends in engagement with the shell and their upper ends in engagement with the nozzle.

2. In a carbureter, the combination of a mixing chamber, a fuel nozzle therein having a discharge opening below its upper end, and a series of yieldable vanes mounted in the mixing chamber so as to incline toward the nozzle and with their upper ends normally in engagement with the nozzle at the discharge opening so as to direct a current of air against said discharge opening.

3. In a carbureter, the combination of a cylindrical mixing chamber, a cylindrical fuel nozzle therein having a circumferential discharge opening, and a series of yieldable vanes mounted in the mixing chamber and extending up to and ending at said discharge opening and together normally constituting a frusto-conical shell.

4. In a carbureter, the combination of a mixing chamber, a cylindrical fluid nozzle therein having a circumferential discharge opening, means for supplying liquid fuel to the nozzle, and yieldable means for directing a current of air against said nozzle at the discharge opening, said means comprising a series of upwardly extending plates whose upper ends normally engage the nozzle at said discharge opening.

5. In a carbureter, the combination of a cylindrical mixing chamber, a fluid nozzle therein having a narrow discharge opening in a plane at right angles to the axis of the chamber, and yieldable means for directing the air that passes through the chamber against said nozzle at the discharge opening, said means comprising vanes extending downwardly and outwardly from said discharge opening.

6. In a carbureter, the combination of a cylindrical mixing chamber, a float chamber surrounding it, a tubular support extending across the lower end of the mixing chamber and communicating with the float chamber, a tube mounted in the support and having holes opening into the interior thereof, a collar mounted on the tube and having a concave upper end, a second collar mounted on the tube and having a convex lower end, the space between the collars tapering outwardly and inclined upwardly, said tube having openings to permit fuel to flow into said space, and a series of yieldable vanes mounted in the mixing chamber and normally constituting a frusto-conical shell whose lower edge engages the mixing chamber and whose upper edge engages the lower collar just below the upper edge of the collar.

In testimony whereof I have signed this specification in the presence of two subscribing witnesses.

GILBERT CHRISTIAN.

Witnesses:
EDWARD N. PAGELSEN,
L. M. SPENCER.